United States Patent
Garrote et al.

(10) Patent No.: US 12,360,783 B2
(45) Date of Patent: Jul. 15, 2025

(54) API GOVERNANCE ENFORCEMENT ARCHITECTURE

(71) Applicant: Salesforce, Inc., San Francisco, CA (US)

(72) Inventors: Antonio Garrote, San Francisco, CA (US); Pedro Colunga, Pilar (AR); Jonathan Stoikovitch, San Francisco, CA (US); Martin Alejandro Gutierrez, Pilar (AR); Lucas Block, Pilar (AR); Lucas Luppani, Pilar (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/948,902

(22) Filed: Sep. 20, 2022

(65) Prior Publication Data

US 2023/0116336 A1    Apr. 13, 2023

Related U.S. Application Data

(60) Provisional application No. 63/246,098, filed on Sep. 20, 2021.

(51) Int. Cl.
*G06F 16/00* (2019.01)
*G06F 8/41* (2018.01)
(Continued)

(52) U.S. Cl.
CPC .......... *G06F 9/44526* (2013.01); *G06F 8/427* (2013.01); *G06F 9/541* (2013.01);
(Continued)

(58) Field of Classification Search
CPC ............. G06F 16/13–14; G06F 16/156; G06F 16/2255; G06F 16/1865; G06F 16/211;
(Continued)

(56) References Cited

U.S. PATENT DOCUMENTS 7,814,544 B1 *  10/2010  Wilhelm ............... G06F 21/566
                                                            726/22
8,745,641 B1 *  6/2014  Coker .................. G06F 11/3668
                                                            719/318
(Continued)

FOREIGN PATENT DOCUMENTS

CA    2287092 A1 *  4/2000
EP    3722968 A1 * 10/2020
(Continued)

OTHER PUBLICATIONS

Miklós Kalman et al., "Rule-Based Web Service Validation", 2014 IEEE International Conference on Web Services, Jun. 2014, (pp. 542-549).*

(Continued)

*Primary Examiner* — Srirama Channavajjala
(74) *Attorney, Agent, or Firm* — Sterne, Kessler, Goldstein & Fox P.L.L.C.

(57) ABSTRACT

Disclosed herein are system, method, and computer program product embodiments for providing an architecture to support a semantic validation technique. The system includes a governance console that carries out data management functionalities to support the validation. Such functionalities include generating, storing and publishing validation profiles that are used by a validation service for validating an asset, a validation reporter that receives and stores validation reports and performs notification functions to notify relevant individuals of the validation results, as well as a profile runner and associations manager that directly support the validation service.

17 Claims, 8 Drawing Sheets

(51) Int. Cl.
*G06F 9/445* (2018.01)
*G06F 9/54* (2006.01)
*G06F 11/3604* (2025.01)
*G06F 11/3668* (2025.01)
*G06F 16/18* (2019.01)
*G06F 16/22* (2019.01)
*G06F 16/23* (2019.01)
*G06F 16/2455* (2019.01)
*G06F 16/2457* (2019.01)
*G06F 16/2458* (2019.01)
*G06F 16/25* (2019.01)

(52) U.S. Cl.
CPC .......... *G06F 9/547* (2013.01); *G06F 11/3608* (2013.01); *G06F 11/3692* (2013.01); *G06F 16/1865* (2019.01); *G06F 16/2255* (2019.01); *G06F 16/2365* (2019.01); *G06F 16/24564* (2019.01); *G06F 16/24573* (2019.01); *G06F 16/2458* (2019.01); *G06F 16/2462* (2019.01); *G06F 16/252* (2019.01)

(58) Field of Classification Search
CPC ........... G06F 16/24573; G06F 16/2462; G06F 16/2458; G06F 16/248; G06F 16/24564; G06F 16/284; G06F 16/78; G06F 16/783
See application file for complete search history.

(56) References Cited

U.S. PATENT DOCUMENTS

| | | | |
|---|---|---|---|
| 9,313,207 B2 * | 4/2016 | Cicchitto | G06F 21/6227 |
| 9,552,237 B2 * | 1/2017 | Biesack | G06F 9/541 |
| 10,037,407 B2 * | 7/2018 | Sevenster | G16H 10/60 |
| 10,133,650 B1 * | 11/2018 | Park | G06F 11/3684 |
| 10,983,963 B1 | 4/2021 | Venkatasubramanian et al. | |
| 11,042,647 B1 * | 6/2021 | Joyce | G06F 21/577 |
| 2004/0268305 A1 | 12/2004 | Hogg et al. | |
| 2006/0095276 A1 * | 5/2006 | Axelrod | G06Q 99/00 717/104 |
| 2007/0214144 A1 * | 9/2007 | Lawson | G06F 21/6218 707/999.009 |
| 2008/0028069 A1 * | 1/2008 | Urbanek | G06Q 10/10 709/224 |
| 2008/0034425 A1 * | 2/2008 | Overcash | G06F 21/55 726/22 |
| 2010/0318858 A1 * | 12/2010 | Essawi | G06F 16/21 714/49 |
| 2012/0054095 A1 * | 3/2012 | Lesandro | G06F 9/452 705/39 |
| 2013/0166515 A1 * | 6/2013 | Kung | G06Q 10/063 707/690 |
| 2013/0298259 A1 * | 11/2013 | Mattsson | G06F 21/6209 726/28 |
| 2015/0089345 A1 * | 3/2015 | Marimuthu | G06F 40/174 715/221 |
| 2017/0006066 A1 * | 1/2017 | Eckel | H04L 63/20 |
| 2017/0103472 A1 * | 4/2017 | Shah | H04L 9/32 |
| 2017/0177882 A1 | 6/2017 | Allgaier | |
| 2017/0262441 A1 * | 9/2017 | Horowitz | G06F 16/215 |
| 2017/0286456 A1 | 10/2017 | Wenzel et al. | |
| 2018/0314622 A1 * | 11/2018 | Lowe | G06F 11/3616 |
| 2019/0130434 A1 * | 5/2019 | Lurie | G06Q 30/0224 |
| 2020/0250176 A1 * | 8/2020 | Padmanabhan | G06F 16/27 |
| 2020/0401506 A1 * | 12/2020 | Sathianarayanan | G06F 11/3688 |
| 2022/0101153 A1 | 3/2022 | Hubauer | |
| 2023/0047837 A1 * | 2/2023 | Chilupuri | G06F 9/547 |

FOREIGN PATENT DOCUMENTS

| | | | |
|---|---|---|---|
| WO | WO 2014189552 A1 * | 11/2014 | |
| WO | WO2016048418 A1 * | 3/2016 | |
| WO | WO2016070145 A1 * | 5/2016 | |

OTHER PUBLICATIONS

Patrice Godefroid et al., "Intelligent REST API data fuzzing", ESEC/FSE 2020: Proceedings of the 28th ACM Joint Meeting on European Software Engineering Conference and Symposium on the Foundations of Software Engineering, Nov. 2020, pp. 725-736.*

Hao Zhong et al., "An Empirical Study on API Parameter Rules", 2020 IEEE/ACM 42nd International Conference on Software Engineering (ICSE) (2020, pp. 899-911).*

Vaggelis Atlidakis et al., "Checking Security Properties of Cloud Service REST APIs", 2020 IEEE 13th International Conference on Software Testing, Validation and Verification (ICST) (2020, pp. 387-397).*

* cited by examiner

API GOVERNANCE ENFORCEMENT ARCHITECTURE

CROSS-REFERENCE TO RELATED APPLICATIONS

This application claims the benefit of U.S. Provisional Patent Application No. 63/246,098, filed Sep. 20, 2021, entitled "API Governance Using Validation Rulesets," which is incorporated by reference herein in its entirety.

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAML) or OpenAPI Specification (OAS).

An endpoint of an API includes an access point (e.g., a URL) through which a user can interact with the API (e.g., input and output flows). An API can include one or more endpoints. It is of interest for API developers to make sure APIs behave reliably so as to provide users reliable interaction with the API.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for supporting API governance.

Development and publishing of application programming interfaces (APIs) is a complex process that requires may different components and several different processes. Among those processes is a validation process to ensure that rules and rulesets associated with the APIs are functioning properly. Related U.S. patent application Ser. No. 17/948,523, filed Sep. 20, 2022, and entitled "Semantic Metadata Validation," the subject matter of which is incorporated herein by reference in its entirety, describes a validation mechanism that is capable of supporting multiple different formats. In order to achieve the advanced aspects described in those applications, a supporting architecture is needed that provides the necessary functionality and physical elements sufficient to enable their unique characteristics.

Accordingly, systems and methods for a governance enforcement architecture are disclosed herein.

During development of application programming interfaces, APIs and rulesets associated with them undergo various testing processes in order to ensure that the APIs are properly configured. Once such process is referred to as validation, which generally refers to the process of verifying that the data being sent to the API is appropriate and valid for use by the API. Traditionally, there are many different formats by which to define APIs and their respective rules. However, the disclosure of the above related application Ser. No. 17/948,523, the subject matter of which is incorporated by reference herein in its entirety, discloses a validation scheme that is semantic in that it operates on APIs and rules regardless of their formats and regardless of whether all the rules are in the same format. In order to support this unique functionality, an unique architecture is required as will be discussed in further detail below.

In order to validate REST APIs, a validation framework may be used. While REST API validation frameworks allow for robust implementation of validating rules, in some embodiments, publication of governance rulesets that can be validated against any compatible metadata representation of a resource. Association of different rulesets to assets are based on an arbitrary selector query mechanism. Embodiments disclosed herein provide the architectural blocks required to support a set of governance enforcement tasks.

Governance with regards to data is a concept that allows organizations to ensure that high data quality exists throughout the entire lifecycle of the data. Data controls can be executed to support business objectives. Data governance includes, but is not limited to the availability of the data, the usability of the data, the consistency of the data, data integrity, and data security. Processes should be implemented to ensure effective data management throughout an enterprise.

A ruleset is a collection of rules that can be applied over metadata extracted from multiple resources (i.e. exchange assets, API specs, deployment descriptors) in a platform. These resources can be validated with the ruleset as long as the metadata generated therein is compatible.

In some cases, rules are captured as a simple Resource Description Framework (RDF) based on Shapes Constraint Language (SHACL) constraints. Any format that can be parsed by Action Message Format (AMF) or described using AnyPoint Modeling Language (AML) can be validated herein.

A simplified syntax based on AMF validation profiles can be exposed to users authoring rulesets. This metadata, including both the validation profile and the resource being validated, can be natively stored within an Application Network Gateway (ANG). Validation rules are added to a validation profile with an assigned severity level, which changes how an error with the validation is reported.

The validation profile stores metadata documenting the use case for the rule including information such as category of the rule, level (i.e., section, subsection, paragraph), author, state of the rule (draft, approved, deprecated), positive and negative code examples, and additional associated documentation. This information in the validation profile is used to generate markdown documentation for the ruleset that can easily be read by a human user to understand the rationale behind the ruleset. It is possible to introduce rules that do not include validation logic and only document general aspects or best-practices. These and other aspects will be further described with respect to the figures.

Rulesets are collections of rules that can be applied over the metadata extracted from any resource in an API development platform. Exchange assets, API specification, deployment descriptors, and other resources are capable of being validated with a ruleset provided that that compatible metadata can be generated from them. In the implementation described in the above-related application, rules are captured as a simple Resource Description Framework (RDF) model based on Shapes Constraint Language (SHACL) structural constraints. Any format that can be parsed by Anything Modeling Framework (AMF) or that can be described using Anything Modeling Language (AML) can be validated with this implementation. The validator also supports validation of raw JavaScript Object Notation (JSON) and Yet Another Markup Language (YAML) documents without any special semantics.

In embodiments, a simplified syntax based on AMF Validation Profiles is exposed to technical users authoring rulesets. As a result, all this metadata, including both the validation profile and the resource being validated, is natively stored on an ANG. Validation Rules are added to a profile with an assigned severity level, changing how a validation error is reported. Additionally, a validation engine applies all the validation rules in the profile to an input metadata graph and generates a validation report reporting if the input metadata graph conforms to the profile or not. If a single validation rule fails according to the severity level, then the input metadata graph will not conform. On the other hand, if the severity level amounts to a warning status, info status, or pass status, then the validation rules will be deemed conformant.

Figure 1:
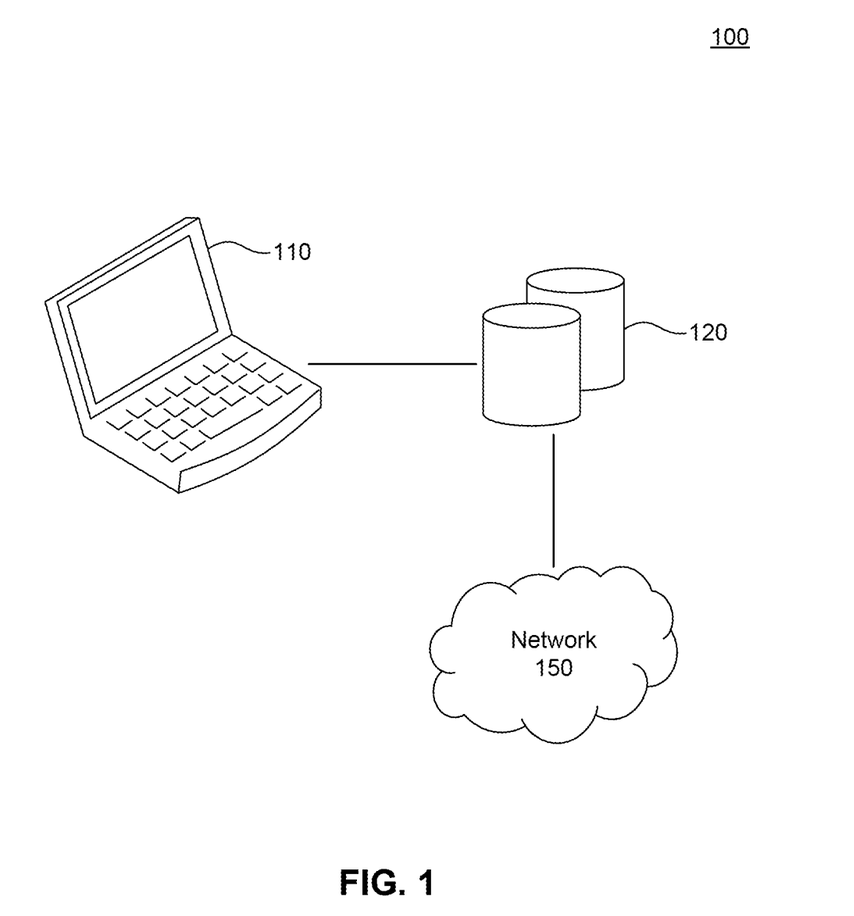
FIG. 1 illustrates a block diagram of an example validation environment according to embodiments of the present disclosure.

In order to support the above functionality, a validation architecture is disclosed. For example, FIG. 1 illustrates a block diagram of an example validation environment according to embodiments of the present disclosure. As shown in FIG. 1, a validation console 110 is connected to one or more servers 120 hosting a number of databases. In an embodiment, the console and the servers are connected to a network 150.

In embodiments, the console 110 provides the user interface through which the user interacts with the backend servers 120. In embodiments, the console includes a Command Line Interface (CLI) or other user interface to allow the developer to access the development environment as well as the validation functionalities of the servers 120.

Meanwhile, the servers 120 carry out the validation functions described herein. Together, the console 110 and the servers 120 provide the architecture necessary for implementing semantic validation. Once validated, the console works with the servers to carry out publication of the APIs by making them available and visible in the network 150.

Figure 2:
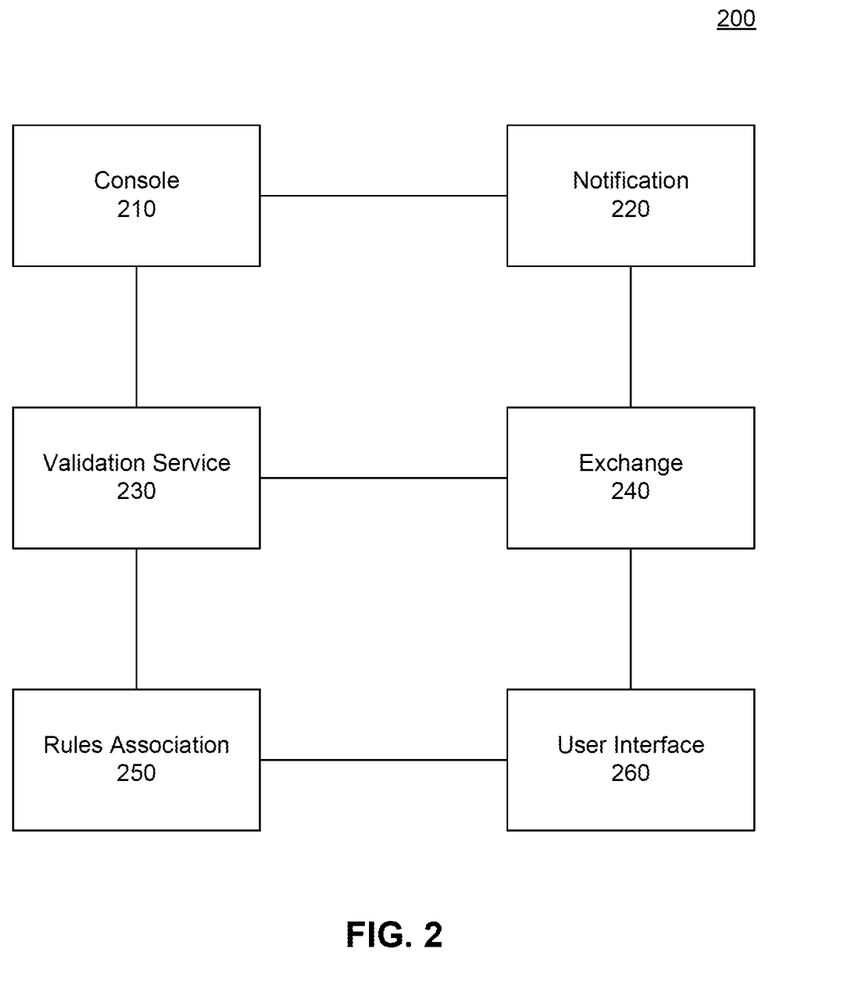
FIG. 2 illustrates a block diagram of an exemplary architecture according to embodiments of the present disclosure.

FIG. 2 illustrates a block diagram of an exemplary architecture 200 according to embodiments of the present disclosure. As shown in FIG. 2, the architecture includes a console 210, a notification service 220, a validation service 230, an exchange service 240, a rules association service 250, and a user interface 260. These elements are discussed in further detail below with respect to the figures.

Figure 3:
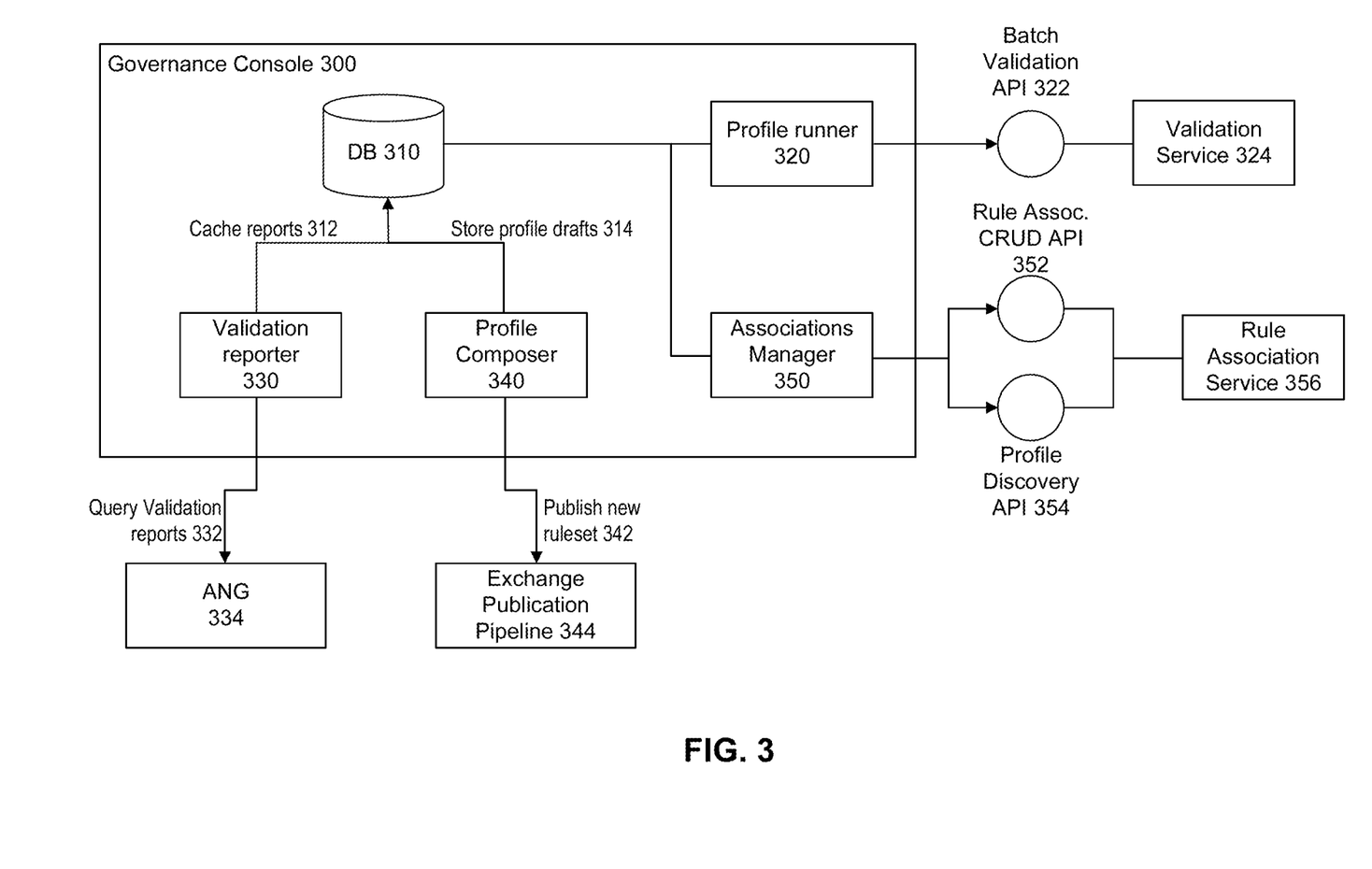
FIG. 3 illustrates a block diagram of an exemplary governance console according to embodiments of the present disclosure.

FIG. 3 illustrates a block diagram of an exemplary governance console 300 according to embodiments of the present disclosure. As shown in FIG. 3, the governance console includes a database 310, a profile runner 320, a validation reporter 330, a profile composer, and an associations manager 350. The database 310 is any suitable data storage entity, including any types of databases, such as relational databases, SQL databases, etc. According to an embodiment, the database 310 is an Amazon Web Services (AWS) Relational Database Service (RDS).

The database 310 stores validation profiles associated with various APIs. Each validation profile includes the validation rules and severity levels that are applied to a particular node. In an embodiment, the validation profiles can be extended and reused. When one profile extends another profile, all the validation rules are included in the set of rules of the extender but the severity level associated with the inherited rules can be changed and some rules deactivated. In an embodiment, validation profiles are modularized by referencing individual rules declared in other profiles. In this instance, the severity level of the rules can be changed in the profile referencing them. In other words, a validation profile can set a pointer to another validation profile or rule, but can still separately indicate its own severity level.

In an embodiment, the validation rules contained within the validation profile comply with a standard syntax, such as AMF custom validation dialect. An example syntax to define a new profile is provided below.

% Validation Profile 1.0 profile: mercury #name of the profile extends: RAML #extension from standard RAML profile validation from the RAML profile disable in this profile
   disabled:

amf-parser.WebAPI-mediaType-datatype validation with severity level 'warning' warning:

camelcase-query-parameters camelcase-method-displayname enabled validations violation:

at-least-one-2xx-or-3xx-response https-required require-api-description no-literal-question-marks-in-property-names no-literal-question-marks-in-parameters no-todo-text-in-description-fields require-method-description require-response-description require-json
resource-name-validation
version-format
declaration of new validations in this profile validations:
t-least-one-2xx-or-3xx-response:
[ . . . additional rule definitions here]

As can be seen in the above example, a "profile" tag first defines the name of the profile. An "extends" tag may be included after the "profile" tag. This "extends" tag defines whether this profile is an extension of some other profile. In the example above, this profile is an extension of the RAML profile. Thereafter, the validations that are changed from the original profile are defined. Specifically, a "disabled" grouping defines any validations from the original profile that are not to be applied. In the example above, "amf-parser.WebAPI-mediaType-datatype" is disabled.

In embodiments, warning-level validations are also defined. Such warning-level validations are defined such that their failure does not result in a violation, but rather merely a warning. Examples may include syntax errors, missing function variables, etc. In other words, the policy may be capable of compiling and executing, but could result in errors in certain scenarios.

In embodiments, enabled validations are next defined. These validations result in violations when failed. In the above example, such validations include "at-least-one-2xx-or-3xx-response" and "https-required" among others.

In embodiments, a "validations" group is provided within which additional rule definitions can be defined. In the above example, the "at-least-one-2xx-or-3xx-response" includes further rule definitions, which will be listed below its label within the "validations" section. Using this format, the user is able to define a new profile that can be implemented within the API environment.

The console also includes a validation reporter 330. As will be discussed in further detail below, the validation process results in a validation report that details the results of the validation process including whether any nodes or rules failed or passed validation, and to the degree of severity. These reports are stored in network-accessible location, such as a network accessible database. In an embodiment, the validation reports are stored in or can be accessible via an ANG 334. The validation reporter 330 queries the ANG 334 for any validation reports that are relevant to the APIs and rules managed by the console 300, and then caches the reports in the database 310.

The console 300 also includes a profile composer 340. The profile composer 340 allows the developer to generate the validation profiles that define the rules that will be applied to a particular node. The profile composer 340 provides an interface between a development environment and the governance console 300, such that the developer can edit code, define metadata inputs and desired outputs, etc. Once a developer completes a given ruleset, the profile is stored in the database 310. The developer also has the option of publishing the new ruleset into an exchange publication pipeline 344.

The console also includes a profile runner 320. The profile runner 320 is responsible for providing the validation profile to the validation service. In an embodiment, the profile runner 320 accesses the database 310 automatically and forwards the profile to a batch validation API 322 for use with the validation service 324. However, in another embodiment, the batch validation API 322 queries the profile runner 320 for the relevant validation profile upon being activated by the validation service. In response to the query, the profile runner 320 retrieves the relevant validation profile from the database 310 and provides it to the batch validation API 322.

The console 300 also includes associations manager 350. As will be discussed in further detail below, a rule association service, such as the rule association service 356, provides two primary functions: managing selection of metadata resources that will be targeted by different rulesets; and dynamically discovering the set of rulesets that must be applied to a specific metadata resource being validated. Based on the validation profile stored in the database 310, the associations manager 350 provides information to the rule association service to assist with those functions. For example, in an embodiment, a rule association Create, Read, Update, and Delete (CRUD) API 352 and/or a profile discovery 354 cause the associations manager 350 to retrieve the rule associations from the database 310 and provides them to the rule association service 356.

In operation, a developer uses the profile composer 340 to generate a validation profile associated with one or more rulesets. The developer publishes new rules sets via the profile composer 340, and also stores the created validation profile in the database 310. The profile runner 320 provides the validation profile to the validation service 324 via a batch validation API 322. Meanwhile, the associations manager 350 manages the relationships between the rulesets and the validation profiles. For example, in an embodiment, the associations manager maintains a relationship between validation profiles and their respective rulesets. This association is further managed when a given validation profile applies to multiple different rulesets, or when a validation profile is a mere modification of another validation profile. The associations manager 350 receives requests for this information from the rule association service 356 via the CRUD API 352 and the Profile Discovery API 354 and provides the requested associations in response thereto. In an embodiment, profile discovery 354 accepts an organization ID and generates links to the ANG resource where the profile is stored for every matching profile.

As shown in FIG. 2, the architecture further includes a notification component 220. After validation of a particular asset has been carried out, a notification must be generated and pushed through different channels in order to notify the asset owner or governance officer. The notification service 220 maintains an association between the rulesets being validated and the asset owners, as well as the method of contacting the asset owners. When a validation service is complete, a report is generated that indicates whether the ruleset being validated passed or failed, and to what degree. Specifically, as discussed above, the validation process can produce a variety of different results, including but not limited to a warning status, an info status, a pass status, or a fail status. Of those, all but the fail status may be considered to be conformant, but to varying degrees. For example, in embodiments, the info status does not find any errors, but may have identified one or more anomalies or incongruities that should be brought to the attention of the asset owner. Meanwhile, a warning status indicates that an anomaly has been detected that may affect performance.

In an embodiment, the notifications service 220 identifies the status that results from the validation, and determines whether a notification is needed. In some embodiments, a notification is always provided to a relevant individual regardless of the status. In other embodiments, the notification service 220 maintains a correspondence between statuses and notifications. In other words, for each ruleset, the notification service 220 has an identification of whether to transmit a notification, to whom to transmit the notification, and notification triggers. Thus, when a validation result is received by the notification service 220, the notification service reviews the notification profile associated with the rules. Then, based on the notification profile, the notification service 220 transmits a notification to one or more identified individuals based on the severity.

In an example, a particular ruleset may be configured with a notification profile that dictates contacting only the asset owner in response to an info status validation result, dictates notifying the asset owner and a governance officer in response to a warning or fail status, and does not transmit any notifications otherwise. Then after validation is performed, the validation service 230 produces a warning status. As a result, the notification service 220 transmits a notification to both the asset owner and the governance officer based on the notification profile. In embodiments, the notification identifies the ruleset, the result of the validation process (pass/fail), and the severity level. In some embodiments, the notification service 220 is also configured to identify the file and/or line of code that is causing the status.

As shown in FIG. 2, the architecture also includes validation service 230. The validation service 230 carries out validation of the rulesets. Specifically, the validation service encapsulates the core open policy agent (OPA) validation for any metadata resource and validation profile. The validation service 230 performs at least two primary functions. First, the validation service provides a synchronous validation capability of a single metadata resource. Second, the validation service 230 performs batch validation of all the relevant resources for a provided validation profile.

In order to validate an individual resource, the metadata of the resource or a link to an accessible location for the resource metadata must be provided together with the organization ID of the customer requesting the validation. With this information, the validation service requests the set of constraints that must be applied for that resource and organization ID from the Rule Associations Service. The validation service 230 receives the set of rules in response to the request, and then applies each individual profile over the resource. The validation service 230 then generates a validation report per profile. In an embodiment, a single validation report is generated per profile. In an embodiment, the report is returned as a single JSON-LD document. In an embodiment, the validation is performed synchronously and the results of the validations are returned to the client.

Figure 4A:
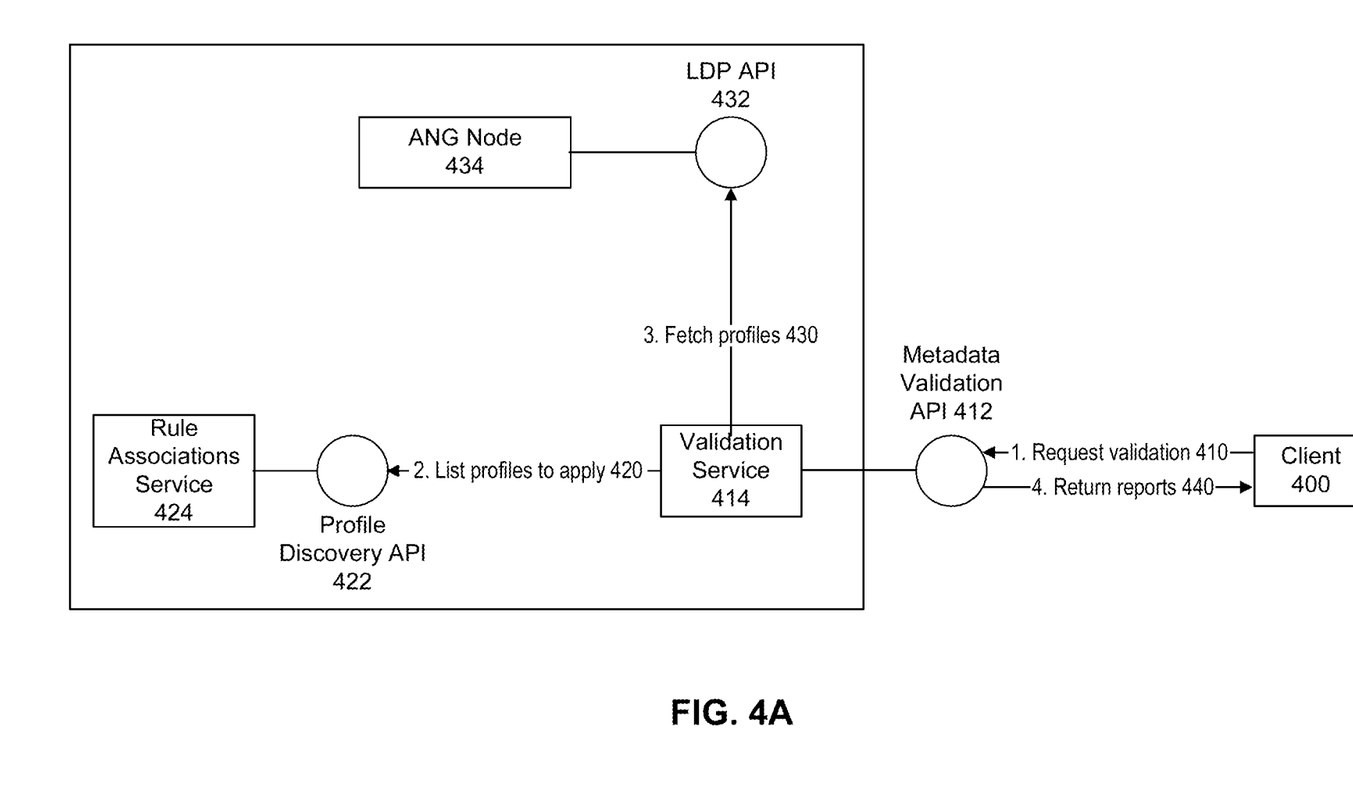
FIG. 4A illustrates a block diagram of the governance architecture interacting with the governance services according to embodiments of the present disclosure.

FIG. 4A illustrates a block diagram of the governance architecture interacting with the governance services according to embodiments of the present disclosure. As shown in FIG. 4, the governance architecture includes the validation service 414, the ANG node 434, and the rule associations service 424. As shown in FIG. 4, the validation service communicates with the profile discovery API 422, which retrieves the set of rules from the rule association service 424, and provides the set of rules to the validation service 414. In the meantime, the validation service 414 also requests the validation profiles from the ANG node 434. In an embodiment, the fetch request is handled by a linked data platform (LDP) API 432, which generally defines a set of rules for HTTP operations on web resources, some based on RDF, to provide an architecture for read-write Linked Data.

Upon receiving the profile from the ANG node 434, and the set of rules from the rule association service 424, the validation service carries out validation of the ruleset. In an embodiment, the validation service produces a report, which it then transmits to a client 400. In embodiments, the validation process is initiated based on a request from the client 400. In other embodiments, validation is performed automatically based on one or more triggering conditions. In an embodiments, a metadata validation API 412 handles communication between the validation service 414 and the client 400.

Figure 4B:
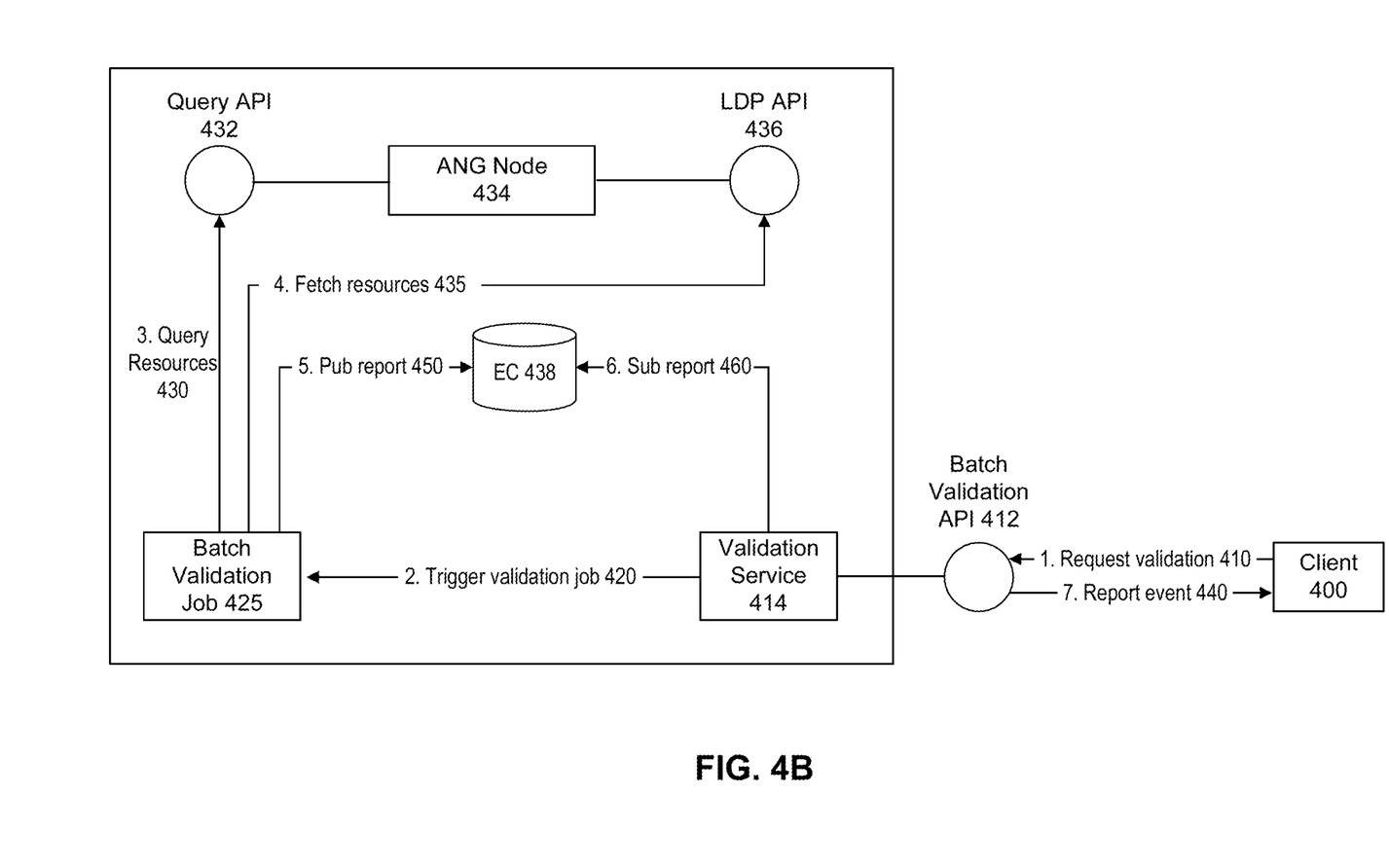
FIG. 4B illustrates a block diagram of an example governance architecture according to embodiments of the present disclosure

FIG. 4B illustrates a block diagram of an example governance architecture according to embodiments of the present disclosure. As shown in FIG. 4B, the governance architecture is substantially similar to that of FIG. 4A, except that the architecture further includes a batch validation 425 and a caching service 438. In an embodiment, caching service 438 may be realized as an ElasticCache (EC)—a managed caching service for Redis and Memcached.

As discussed above, the validation service 414 is also responsible for batch validation. The batch validation API is a complementary use case to the single resource validation API described above. In this embodiment, instead of an individual resource, the URL or metadata for a new validation profile and ruleset association query for a particular organization ID is received and the Validation Service 414 runs a report over all the resources already stored in ANG 434 that have potential targets for that profile and association query.

To achieve this, the Validation Service 414 triggers a new type of ANG job, the "batch validation job," that fetches a list of target resources running the association query for that organization ID over ANG 434. As a result, the validation service 414 fetches the resources and validates them with the provided profile. As in the case of the Individual Validation API, the result is a list of validation reports. In this case, each report is for a different resource over the same profile, instead of multiple profiles over the same resource. The validation service 414 then reports the progress to the client using pub/sub notifications over the shared ElasticCache instance 438.

In an embodiment, in order to ensure consistency between validations being executed in design tools and backend, a JSON-LD graph that will be the target of the validation in the case of API contracts is the design version of the graph as provided directly by AMF or by AMF service. This representation is already available in the case of the publication pipeline validation. However, for batch validation, the batch-validation job must obtain the final JSON-LD representation from AMF-Service for web and async APIs.

The architecture 200 also includes exchange 240 that performs badge generation. As part of the use cases for governance, assets published into Exchange that must be validated following a specific validation profile and validated successfully, must display a new type of 'badge' in the user interface of the asset portal, showcasing compliance with that particular set of rules. To accomplish this, association rules for that kind of asset and the desired profile must already be stored in the rule association service.

Provided that the association rules and profile are stored, an Exchange Publication Pipeline invokes the synchronous logic in the validation service 414 and if a successful report is obtained, metadata for the badge and report is associated to the asset and stored into ANG 434 for the right UI components to be displayed and searched over compliant assets.

In an embodiment, the badge metadata is inserted directly into an Asset metadata model at the patch level of the asset. In this embodiment, enough information must be stored in order to satisfy the user experiences defined for the Exchange portal UI, including a link to the information of the report and profile used. Additionally, the generated validation reports must be stored in a new container, and should include information about the time the validation was performed in order to satisfy reporting use cases associated with the Governance Console. In an embodiment, the new container is a 'GovernanceReports' ANG container. This information will be stored in the common asset view to satisfy search use cases.

In a further embodiment, each resource in the Governance Reports container must be linked to the asset that was validated from the Assets container and to the Ruleset that was used to perform the validation. In this embodiment, this interaction happens every time a new resource is published in Exchange, either from API Designer, Studio, manual upload or through CLI auto-discovery capability.

Figure 5:
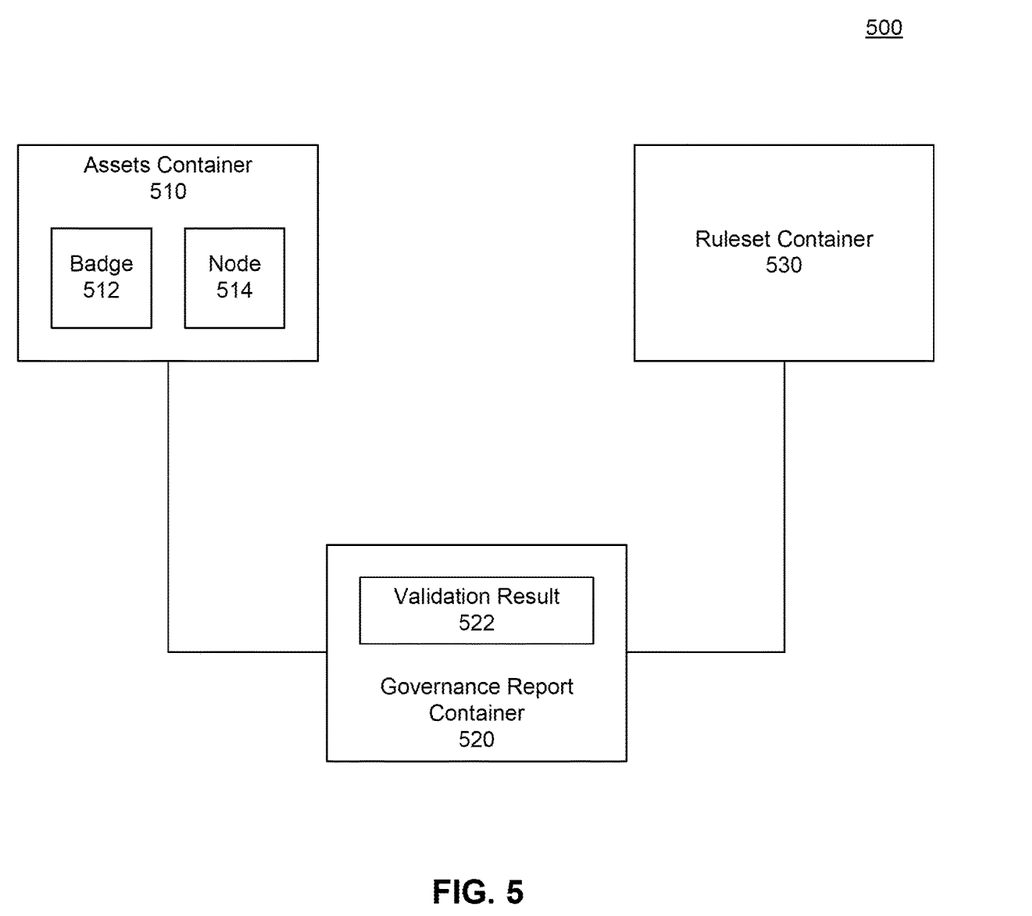
FIG. 5 illustrates a block diagram of an exemplary exchange according to embodiments of the present disclosure.

FIG. 5 illustrates a block diagram of an exemplary exchange 500 according to embodiments of the present disclosure. As shown in FIG. 5, the exchange includes an assets container 510, a governance report container 520, and a ruleset container 530. In an embodiment, the assets container includes a compliance badge 512 and a node 514. Similarly, the governance report container 520 includes a validation result 520.

As described above, the governance report container 520 receives a validation profile from the ruleset container 530. Based on this profile, validation of the node will be carried out, and a report generated. The validation report is stored in a new 'GovernanceReports' ANG container, including information about the time the validation was performed in order to satisfy reporting use cases associated with the governance console. Further, in an embodiment, each resource in the Governance Reports container is linked to the asset that was validated from the assets container 510 and to the Ruleset that was used to perform the validation. Therefore, the stored validation result, includes a pointer or link to the relevant profile, such as via a "validation:profile" tag that identifies the profile to which the validation results are applicable, and a pointer or link to the node under validation, such as via a "validation:target" tag. Meanwhile, in order for the badge metadata to include sufficient information to satisfy the user experiences defined for the exchange portal user interface, the compliance badge 512 further links to the validation result, such as via a "validation:source" tag.

As shown in FIG. 2, the architecture 200 further includes a Rules Association Service 250. Although the rules association service 250 can provide several functions, two important functionalities provided by the rules association service 250 include managing a set of query selectors for each organization that can be used to select the set of metadata resources that will be targeted by different rulesets, and dynamically discovering the set of rulesets that must be applied to a specific metadata resource being validated by a customer belonging to an organization.

In an embodiment, rule associations consist of simple mapping between organization IDs and the list of rulesets that have been enabled for that organization. In an embodiment, the profile discovery capability accepts an organization ID. Then, the rules association service 250 accesses the ANG resource to identify matching profiles based on the organization ID. For every matching profile, the link to the ANG resource where the profile is stored is returned.

As shown in FIG. 2, the architecture 200 further includes a user interface 260. In an embodiment, the user interface 260 is a command line interface (CLI), such as an Anypoint CLI. In an embodiment, the CLI 260 is modified with new types of 'commands' to allow for headless integration with the validation enforcement services. In various embodiments, these commands can include a 'validate' command, through which causes the system to fetch the proper profiles for a resource from the Rule Association Service 250 and to run the validation on the client side. In an embodiment, another command includes a 'test' command, which causes the system to test the impact of a new profile directly invoking the Batch Validation API of the validation service. In an embodiment, the CLI 260 also provides CRUD access over individual profiles stored in the Rule Association Service from the client-side. With these and other modifications, the CLI is capable of supporting the validation architecture 200.

Figure 6:
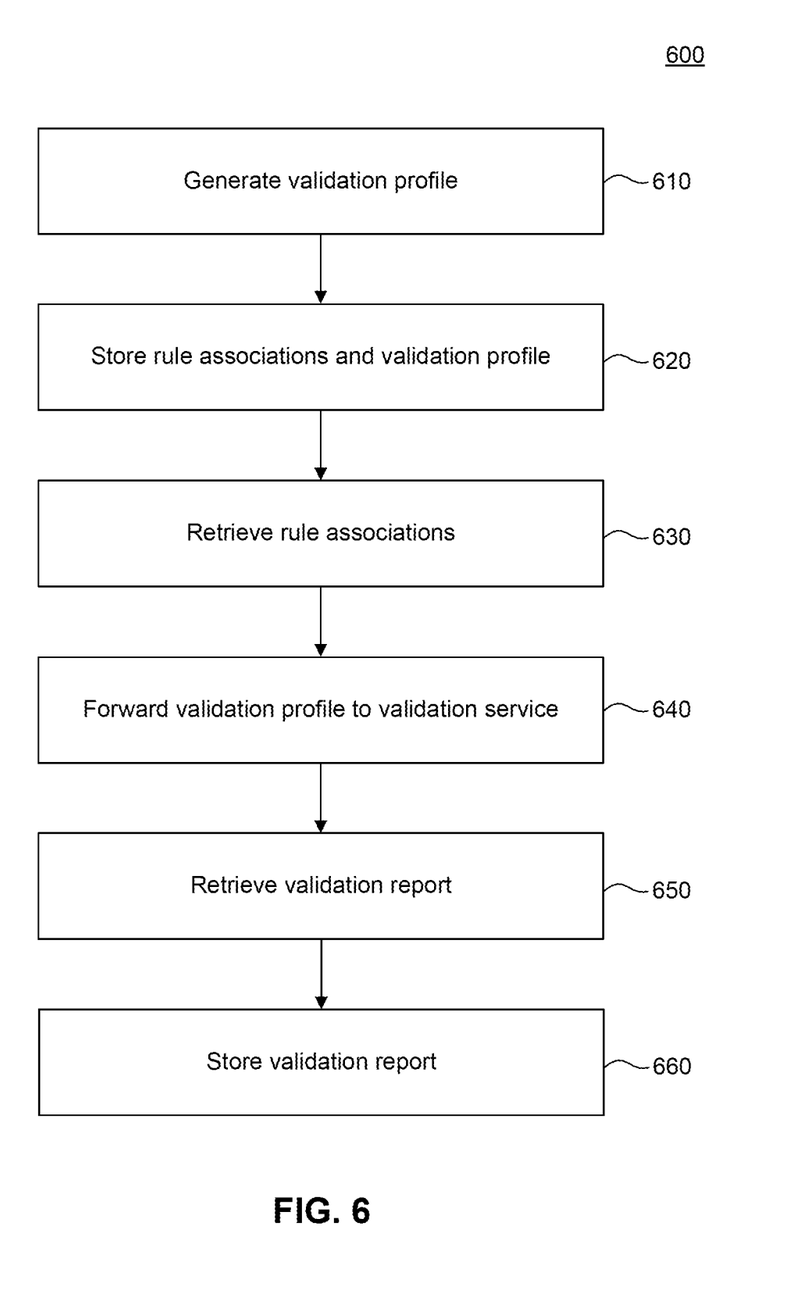
FIG. 6 illustrates a flowchart diagram of an exemplary method 600 for supporting rule validating services according to embodiments of the present disclosure.

FIG. 6 illustrates a flowchart diagram of an exemplary method 600 for supporting rule validating services according to embodiments of the present disclosure. As shown in FIG. 6, the method begins by the user generating a validation profile in step 610. In an embodiment, the validation profile defines validation rules and severity levels that are applied to a particular node.

In step 620, the rule associations and validation profile are stored in memory. In an embodiment, the memory is part of a database. In an embodiment, each validation profile is stored in association with rule associations. In embodiments, the validation profile stores metadata documenting the use case for the rule including information such as category of the rule, level (i.e., section, subsection, paragraph), author, state of the rule (e.g., draft, approved, deprecated), positive and negative code examples, and additional associated documentation.

In step 630, the rule associations are retrieved from the memory. In particular, the rule associations are retrieved from a database by an associations manager to be provided to a rule association service. In an embodiment, the rule associations identify metadata resources that will be targeted by different rulesets.

In step 640, the validation profile is forwarded to the validation service. In an embodiment, the validation service carries out the validation of the rulesets. For example, the validation service encapsulates the core open policy agent (OPA) validation for any metadata resource and validation profile. The validation service performs at least two primary functions. First, the validation service provides a synchronous validation capability of a single metadata resource. Second, the validation service performs batch validation of all the relevant resources for a provided validation profile.

In step 650, based on the operations of the validation service, a validation report is received. In an embodiment, the validation report is generated for each profile and details the results of the validation processes. Namely, in an embodiment, the validation report details for each metadata resource whether the resource was validated, and/or to what degree.

In step 660, the validation report is stored in the database for later retrieval and/or reference by the user or by other systems.

The above descriptions are exemplary, and it should be understood that the steps of any functions can be carried out in different orders. Additionally, although not shown, embodiments of the above-described systems include one or more processors configured to carry out the described functionality. In embodiments, the functions are described by code and/or instructions stored on computer-readable media capable of being executed by the one or more processors. This can be seen, for example, in FIG. 7.

Figure 7:
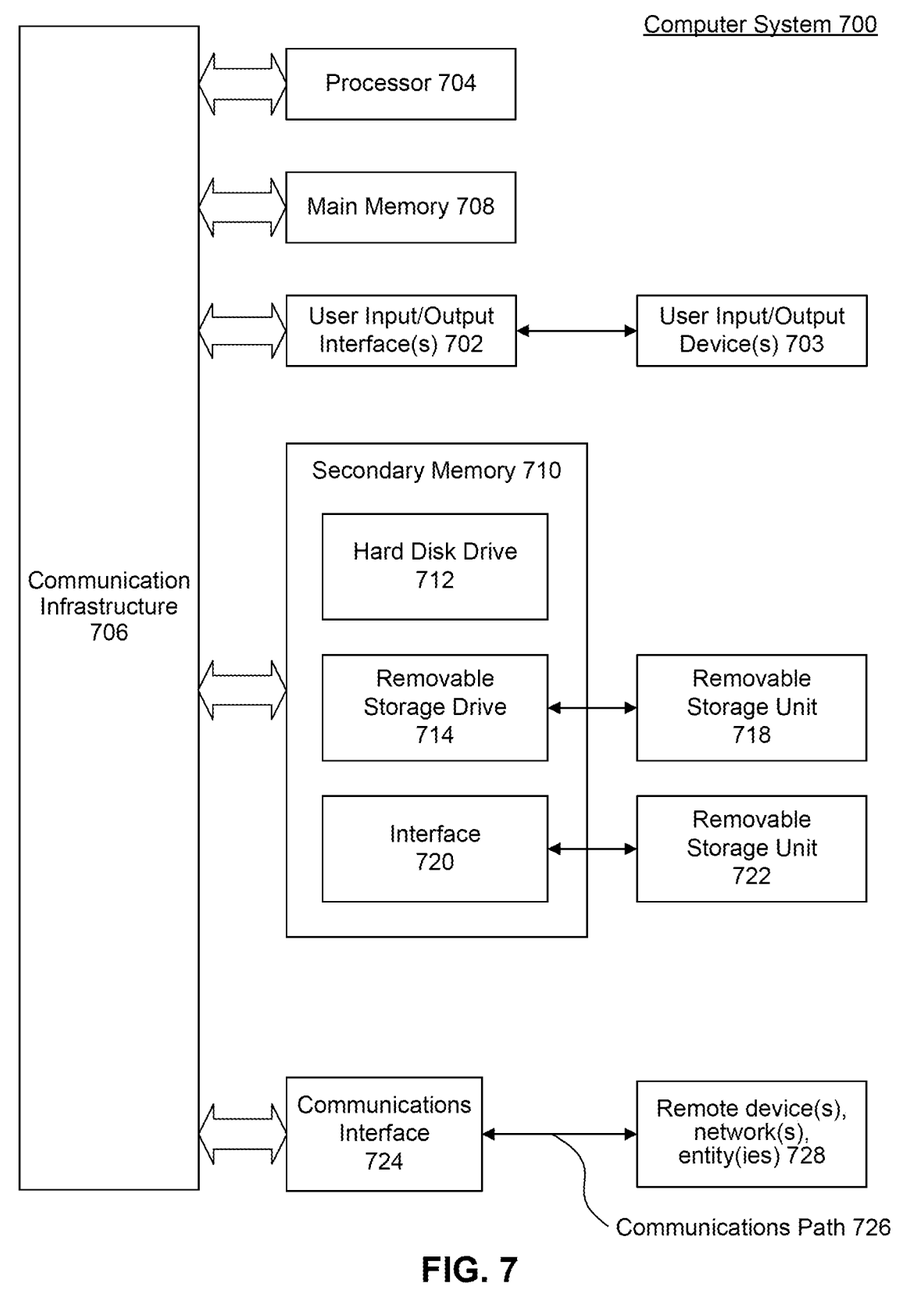
FIG. 7 illustrates a block diagram of an example computer system useful for implementing various embodiments.

Various embodiments can be implemented, for example, using one or more well-known computer systems, such as computer system 700 shown in FIG. 7. One or more computer systems 700 can be used, for example, to implement any of the embodiments discussed herein, as well as combinations and sub-combinations thereof.

Computer system 700 can include one or more processors (also called central processing units, or CPUs), such as a processor 704. Processor 704 can be connected to a communication infrastructure or bus 706.

Computer system 700 can also include customer input/output device(s) 703, such as monitors, keyboards, pointing devices, etc., which can communicate with communication infrastructure 706 through customer input/output interface(s) 702.

One or more of processors 704 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 can also include a main or primary memory 708, such as random access memory (RAM). Main memory 708 can include one or more levels of cache. Main memory 708 can have stored therein control logic (i.e., computer software) and/or data.

Computer system 700 can also include one or more secondary storage devices or memory 610. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 can include a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 can read from and/or write to removable storage unit 718.

Secondary memory 710 can include other means, devices, components, instrumentalities or other approaches for allowing computer programs and/or other instructions and/or data to be accessed by computer system 700. Such means, devices, components, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 can enable computer system 700 to communicate and interact with any combination of external devices, external networks, external entities, etc. (individually and collectively referenced by reference number 728). For example, communication interface 724 can allow computer system 700 to communicate with external or remote devices 728 over communications path 726, which can be wired and/or wireless (or a combination thereof), and which can include any combination of LANs, WANs, the Internet, etc. Control logic and/or data can be transmitted to and from computer system 700 via communication path 726.

Computer system 700 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A governance console, comprising:
   a command line interface configured to provide commands that execute validation functions of a system, the commands including a validate command configured to cause the system to perform validation of a node, and a test command configured to cause the system to test an impact of a new profile invoking batch validation;
   a profile composer configured to generate a validation profile that defines rules applicable to an application program interface (API) node for verifying that data sent to an API associated with the API node is appropriate and valid for use by the API, and to store the validation profile in a database, wherein each of the rules have a corresponding severity level;
   an associations manager configured to retrieve rule associations from the database and provide the rule associations to a rule association service based on the validation profile;
   a validation service configured to validate the API node based on the stored validation profile and the rule associations, and to generate validation reports based on the validating that indicate a status of the rules;
   a validation reporter configured to obtain the validation reports associated with the API node under test from the validation service, and to store the validation reports in the database for later review by a user, and perform a notification operation based on the validation reports, the notification operation including:
      determining, for a validation report from among the validation reports, the status of each of the rules;
      determining a severity for each rule that did not receive a pass status;
      accessing a notification profile associated with the API node under test; and
      transmitting a notification to one or more individuals defined by the notification profile based on the severities of the rules that did not receive a pass status,
   wherein the validation profile is in a common format and represents the API node programmed using one of a plurality of standard API programming languages,
   wherein a rules association service is further configured to dynamically discover a set of rulesets to which to apply a specific metadata resource being validated by a customer belonging to an organization.

2. The governance console of claim 1, further comprising an exchange configured to generate a badge based on the validation report.

3. The governance console of claim 2, wherein the exchange is further configured to store metadata for the badge and the validation report in association with the node, wherein the badge is generated based on the validation report indicating a successful verification.

4. The governance console of claim 1, further comprising the rules association service configured to manage a set of query selectors for the organization for selecting a set of metadata resources targeted by the ruleset.

5. A governance console for use in a ruleset validation system the governance console comprising:
   a memory;
   a command line interface configured to provide commands that execute validation functions of a system, the commands including a validate command configured to cause the system to perform validation of a node, and a test command configured to cause the system to test an impact of a new profile invoking batch validation; and
   one or more processors configured to:
      generate a validation profile that defines rules applicable to an application program interface (API) node for verifying that data sent to an API associated with the API node is appropriate and valid for use by the API, wherein each of the rules have a corresponding severity level;
      retrieve rule associations from the memory and provide the rule associations to a rule association service based on the validation profile;
      validate, by a validation service, the API node based on the stored validation profile and the rule associations;
      generate validation reports based on the validating that indicate a status of the rules;
      obtain the validation reports associated with the API node under test from the validation service;
      store the validation reports in the memory for later review by a user; and
      perform a notification operation based on the validation reports, the notification operation including:
         determining, for a validation report from among the validation reports, the status of each of the rules;
         determining a severity for each rule that did not receive a pass status;
         accessing a notification profile associated with the API node under test; and transmitting a notification to one or more individuals defined by the notification profile based on the severities of the rules that did not receive a pass status, wherein the validation profile is in a common format and represents an API node programmed using one of a plurality of standard API programming languages.

6. The governance console of claim 5, wherein the memory is a database.

7. The governance console of claim 6, wherein the memory is a relational database.

8. The governance console of claim 7, wherein the one or more processors are further configured to publish new rulesets to an exchange publication pipeline.

9. The governance console of claim 5, wherein the one or more processors are further configured to store the validation profile in the memory, wherein the validation profile is generated based on inputs received from the user.

10. The governance console of claim 5, wherein the one or more processors are further configured to cache validation reports in the memory.

11. The governance console of claim 5, wherein the one or more processors are further configured to manage selection of metadata resources targeted by the ruleset, and to dynamically discover the ruleset to be applied to the node being validated.

12. A method, comprising:
providing a command line interface configured to provide commands that execute validation functions of a system, the commands including a validate command configured to cause the system to perform validation of a node, and a test command configured to cause the system to test an impact of a new profile invoking batch validation;
generating, by one or more computing devices, a validation profile that defines rules applicable to an application program interface (API) node for verifying that data sent to an API associated with the API node is appropriate and valid for use by the API, wherein each of the rules have a corresponding severity level;
retrieving rule associations from a database based on the validation profile;
validating, by a validation service, the API node based on the stored validation profile and the rule associations;
generating validation reports based on the validating that indicate a status of the rules;
retrieving the validation reports associated with the API node from the validation service that indicate whether the node passed the rules included within the validation profile;
storing the validation report in the database for later access; and
performing a notification operation based on the validation reports, the notification operation including:
determining, for a validation report from among the validation reports, the status of each of the rules;
determining a severity for each rule that did not receive a pass status;
accessing a notification profile associated with the API node under test; and
transmitting a notification to one or more individuals defined by the notification profile based on the severities of the rules that did not receive a pass status,
wherein the validation profile is in a common format and represents the API node programmed using one of a plurality of standard API programming languages.

13. The method of claim 12, further comprising:
validating a ruleset based on the validation profile; and
generate the validation report in response to the validating.

14. The method of claim 12, further comprising generating a badge based on the validation report.

15. The method of claim 14, wherein the badge is generated based on the validation report indicating a successful verification, and wherein the generating of the badge includes storing metadata for the badge and the validation report in association with the node.

16. The method of claim 12, further comprising managing, by a rules association service, a set of query selectors for an organization for selecting a set of metadata resources targeted by the ruleset.

17. The method of claim 16, further comprising dynamically discovering, by the rules association service, a set of rulesets to which to apply a specific metadata resource being validated by a customer belonging to the organization.

* * * * *

UNITED STATES PATENT AND TRADEMARK OFFICE
CERTIFICATE OF CORRECTION

| | | |
|---|---|---|
| PATENT NO. | : 12,360,783 B2 | Page 1 of 1 |
| APPLICATION NO. | : 17/948902 | |
| DATED | : July 15, 2025 | |
| INVENTOR(S) | : Garrote et al. | |

It is certified that error appears in the above-identified patent and that said Letters Patent is hereby corrected as shown below:

In the Claims

In Column 13, Claim 1, Lines 50-51, delete "application program interface" and insert -- application programming interface --, therefor.

In Column 14, Claim 5, Line 44, delete "application program interface" and insert -- application programming interface --, therefor.

In Column 15, Claim 9, Lines 17-18, delete "wherein the validation profile is generated based on inputs received from the user." and insert the same at Line 18, as a new sub-point.

In Column 15, Claim 11, Line 25, delete "ruleset to be" and insert -- ruleset --, therefor.

In Column 15, Claim 12, Lines 36-37, delete "application program interface" and insert -- application programming interface --, therefor.

Signed and Sealed this
Second Day of September, 2025

Coke Morgan Stewart
*Acting Director of the United States Patent and Trademark Office*